(12) United States Patent
Gialenios et al.

(10) Patent No.: US 6,204,445 B1
(45) Date of Patent: *Mar. 20, 2001

(54) AERIALLY INSTALLED COMMUNICATIONS CABLE

(75) Inventors: Michael Damon Gialenios, Charlotte; David Jonathan Irvin, Hudson; Andy Bryant, Jr., Hickory, all of NC (US)

(73) Assignee: CommScope Properties, LLC, Sparks, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,417
(22) Filed: Feb. 5, 1998
(51) Int. Cl.$^7$ .................................... lp;1pH02G 7/06
(52) U.S. Cl. .............. 174/40 R; 174/41; 174/113 R; 385/100; 385/101
(58) Field of Search ................... 174/40 R, 42, 174/41, 113, 133; 385/100, 101

(56) References Cited

U.S. PATENT DOCUMENTS

| | | |
|---|---|---|
| 292,847 | 2/1884 | Patterson . |
| 379,535 | 3/1888 | Hewitt . |
| 1,307,995 | 6/1919 | Armor . |
| 2,473,965 | 5/1949 | Morrison et al. . |
| 2,564,463 | 8/1951 | Burns . |
| 2,870,237 | 1/1959 | Wilkins et al. . |
| 3,474,183 | 10/1969 | Kelly, Jr. et al. . |
| 4,577,925 * | 3/1986 | Winter et al. ............... 350/96.23 |
| 4,662,712 | 5/1987 | Tabata et al. . |
| 4,717,237 | 1/1988 | Austin . |
| 4,727,222 | 2/1988 | Sato . |
| 4,810,835 | 3/1989 | Richter et al. . |
| 4,832,442 | 5/1989 | Pappas . |
| 4,894,488 | 1/1990 | Gupta . |
| 5,061,823 | 10/1991 | Carroll . |
| 5,092,663 * | 3/1992 | Hivner ........................ 385/100 |
| 5,208,426 | 5/1993 | Kennedy et al. . |
| 5,212,350 | 5/1993 | Gebs . |
| 5,435,395 * | 7/1995 | Connell ........................ 166/384 |
| 5,515,603 | 5/1996 | Ziemek et al. . |
| 5,831,215 * | 11/1998 | Ziemek et al. ............... 174/108 |

FOREIGN PATENT DOCUMENTS

| | | |
|---|---|---|
| 197457 | 4/1958 | (DE) . |
| 1206045 | 12/1965 | (DE) . |
| 808896 | 2/1959 | (GB) . |

OTHER PUBLICATIONS

Brochure from General Electric entitled "*Vulkene Service Drop Cable*".

Quantum Reach®, CommScope General Instrument.

International Search Report for PCT/US 98/02481 filed May 2, 1998 mailed Jun. 5, 1998, A. Moueza.

\* cited by examiner

*Primary Examiner*—Kristine Kincaid
*Assistant Examiner*—W. David Walkenhorst
(74) *Attorney, Agent, or Firm*—Alston & Bird LLP

(57) ABSTRACT

A communications cable is provided having a support strand and at least one coaxial cable helically wound around the support strand. The coaxial cable includes an inner conductor, a dielectric surrounding the inner conductor, an outer tubular metallic sheath surrounding the dielectric, and optionally a protective jacket surrounding the metallic sheath. The communications cable is manufactured such that the ratio of the length of coaxial cable to the length of support strand is between about 1.005 and 1.015. The communications cable is also preferably wound around the support strand using a varying lay length thereby minimizing signal loss due to cable damage. The communications cable of the invention is especially suitable for aerial installation and may be installed in one pass, without the need to form expansion loops in the coaxial cable.

12 Claims, 4 Drawing Sheets

AERIALLY INSTALLED COMMUNICATIONS CABLE

CROSS-REFERENCE TO RELATED APPLICATIONS

This application is related to U.S. patent application Ser. No. 08/848,512, filed Apr. 28, 1997, and U.S. patent application Ser. No. 08/797,555, filed Feb. 6, 1997, both of which have been converted to U.S. provisional applications, and claims the benefit of the earlier filing dates of these applications under 35 U.S.C. §119(e).

FIELD OF THE INVENTION

The present invention relates broadly to communications cable and more particularly to the aerial installation of communications cable suitable for the transmission of RF signals.

BACKGROUND OF THE INVENTION

The coaxial cables commonly used today for the transmission of RF signals include an inner conductor, a metallic sheath surrounding the inner conductor and serving as an outer conductor, and optionally a protective jacket which surrounds the metallic sheath. A dielectric surrounds the inner conductor and electrically insulates it from the surrounding metallic sheath. One exemplary cable construction uses an expanded foam dielectric to surround the inner conductor and fill the space between the inner conductor and the surrounding metallic sheath. In an alternative construction, an air dielectric coupled with polymer spacers in the form of disks is used to support the center conductor in spaced relation from the outer conductor.

One common use for these types of coaxial cable is as trunk and distribution cable for voice, data and video transmissions. Often, the coaxial trunk and distribution cable is installed aerially, e.g., hung between utility poles. One concern in the installation of the coaxial cable is the generally limited bending properties which are characteristic of coaxial cable. Specifically, in installing the coaxial cable, care must be exercised to avoid causing crimps or bends in the coaxial cable because any such crimps or bends will adversely affect the signal propagation properties of the cable. The crimps or bends may also serve as sites for structural failure of the cable after repeated cycles of thermal expansion and contraction due to seasonal and daily temperature changes.

As illustrated in FIGS. 1–4, the conventional method of installing aerial coaxial cable is generally a time consuming process. Typically, as shown in FIG. 1, a support strand 10 or "messenger" is installed first by affixing the strand to a utility pole 12 and directing it along pulleys 14 or by other means to successive utility poles 16. As illustrated in FIG. 2, the coaxial cable 18 is then installed by pulling the coaxial cable along the length of the support strand 10 using pulleys 20 hung from the support strand or other means. The coaxial cable 18 is then affixed to the support strand 10 by lashing or tying the coaxial cable to the support strand as shown in FIGS. 3 and 4. At spaced locations, the coaxial cable 18 is formed into expansion loops 24 as shown in FIG. 4 to accommodate the expansion and contraction of the coaxial cable during seasonal and daily temperature changes. In the conventional installation method, numerous steps must be performed to aerially install the communications cable.

One alternative is to provide the coaxial cable and the support strand or messenger in the same protective jacket and to hang the support strand and the coaxial cable in the same step. However, this particular construction still requires the separate step of forming expansion loops in the coaxial cable to account for thermal expansion.

Although expansion loops may sufficiently address the problem of thermal expansion and contraction, there are various problems associated with the use of expansion loops. For example, the expansion loops are flexed many times during the life of the cable. As a result, localized stress on the expansion loop may lead to cable failure in the loop, therefore affecting a portion if not all of the propagated signal. The tendency of the expansion loop to fail thus necessitates early replacement of the cable. Additionally, the necessity of manually forming expansion loops during installation provides an opportunity for creating undesired crimps or bends in the cable. Furthermore, as described above, the formation of expansion loops in the coaxial cable during its installation is time-consuming.

SUMMARY OF THE INVENTION

The present invention provides a communications cable that can undergo thermal expansion and contraction without the need for expansion loops. In addition, the communications cable of the invention is provided as a single unit thereby allowing the communications cable to be installed quickly in one pass. In particular, the present invention provides a communications cable having a support strand and at least one coaxial cable wound about the support strand in such a way that the coaxial cable can accommodate dimensional changes resulting from thermal expansion and contraction. More particularly, the coaxial cable is helically wound or "stranded" about the support strand or messenger using a specified relationship of excess coaxial cable length to support strand length. The coaxial cable includes an inner conductor, a dielectric surrounding the inner conductor, and an outer tubular metallic sheath surrounding the dielectric. Preferably, the dielectric is an expanded foam dielectric such as a closed cell polyethylene foam. The coaxial cable may additionally include a protective jacket which surrounds the metallic sheath.

Aerially installed coaxial cables of the type to which the present invention is directed are connected at their ends to other components in the cable system by electrical connectors. The cable may extend for hundreds or thousands of feet between connectors. Consequently, thermal expansion and contraction can generate very high tensile forces at the electrical connectors, which can degrade the signal propagation properties of the cable or even cause the coaxial cable to pull out of the connector, disrupting the cable system. It has been discovered, however, that by disposing the coaxial cable in a helically wound configuration around the support strand, and by controlling the ratio of the length of the coaxial cable to the length of the support strand within prescribed parameters of between 1.005 and 1.015, the cable can effectively withstand severe thermal expansion and contraction without the need for expansion loops. In a preferred embodiment, this ratio is maintained at between 1.006 and 1.010. The coaxial cable is also preferably wound around the support strand using varying lay lengths thereby limiting the introduction of structural return loss (SRL) or periodic impedance mismatches which negatively affect the transmitted signal.

Cables using a stranded configuration of conductors and messenger strand have been proposed heretofore for use in certain applications. For example, U.S. Pat. No. 2,473,965 to Morrison et al. shows a stranded cable arrangement used for transmission of electrical power. Small diameter coaxial cables stranded with an insulated support have also been produced for certain specialized low bandwidth applications, such as radio transmission. However, these prior applications do not encounter the severe levels of tensile force during thermal contraction that are encountered by the larger diameter coaxial cables of the present invention. In addition, these prior applications have not recognized the importance of properly controlling the ratio of the cable length to support strand length as is taught by the present invention.

In addition to providing a communications cable as described above, the present invention includes a method of forming a communications cable. The method generally comprises advancing a tensioned support strand and advancing at least one coaxial cable comprising an inner conductor, a dielectric surrounding the inner conductor, and an outer tubular metallic sheath surrounding the dielectric. The advancing coaxial cable helically is guided around the advancing support strand along the length of the support strand while the ratio of the length of the coaxial cable to the length of the support strand is controlled at between 1.005 and 1.015. As described above, the coaxial cable is also preferably wrapped helically around the support strand using varying lay lengths.

The communications cable of the invention may be installed relatively quickly in one pass between utility poles, without the need to form expansion loops in the coaxial cable. Therefore, the coaxial cable is generally not subject to the localized stress that occurs in the expansion loops. In addition, because the coaxial cable is helically wound around the support strand with the ratio of the length of the coaxial cable to the length of the support strand controlled at between 1.005 and 1.015, the coaxial cable can undergo thermal expansion and contraction without pulling out of the connectors. Furthermore, by varying the lay length of the coaxial cable around the support strand, any degradation of the transmitted RF signals resulting from periodic damage to the coaxial cable is minimized.

These and other features of the present invention will become more readily apparent to those skilled in the art upon consideration of the following detailed description which describes the preferred embodiments of the invention and the accompanying drawings.

DETAILED DESCRIPTION OF THE PREFERRED EMBODIMENTS

Figure 5:
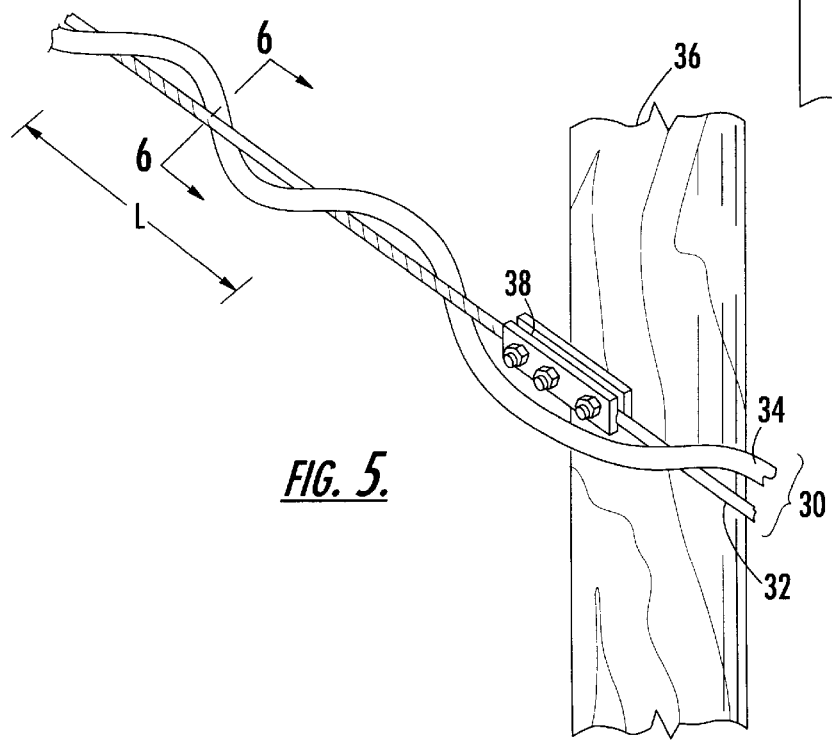
FIG. 5 is a perspective view of an aerially installed communications cable according to the invention.

Referring now to FIG. 5, there is shown a communications cable 30 according to the invention comprising a support strand 32 and a coaxial cable 34. The coaxial cable 34 is helically wound around the support strand 32 along the length of the support strand. Although only one coaxial cable 34 is illustrated in FIG. 5, one or more additional coaxial cables oriented parallel to coaxial cable 34 may also be wound helically around the support strand 32. Additionally, other types of cables may also be wound helically around the support strand 32 parallel to the coaxial cable 34.

The communications cable 30 is typically installed aerially and hung between two predetermined locations, at least one of which is preferably elevated. For example, the communications cable 30 may be hung between a utility pole 36 and a second location, typically a second utility pole. The communications cable 30 is affixed to the utility pole 36 usually by affixing the support strand 32 to the pole by any suitable means such as clamping means 38. The communications cable 30, and particularly, the coaxial cable 34, are typically used for the transmission of RF signals for broadband telecommunications applications such as data, voice, and video applications.

The support strand 32 used in the communications cable 30 of the invention is preferably relatively strong to support the weight of the coaxial cable 34 or cables helically wound around the support strand. An especially suitable material for the support strand 32 is a galvanized steel cable. The support strand 32 may be further surrounded by a protective jacket (not shown) if desired. Suitable materials for the protective jacket include thermoplastic coating materials such as polyethylene, polyvinyl chloride, polyurethane and various rubbers.

Figure 6:
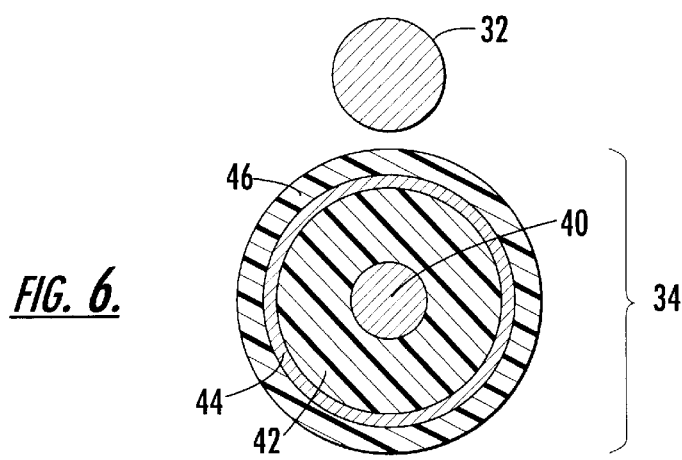
FIG. 6 is a cross-sectional view of the communications cable of FIG. 5 taken along lines 6—6 of FIG. 5 illustrating the support strand and coaxial cable.

The coaxial cable 34 used in the invention is generally of the type which transmits RF signals, such as for broadband applications having a bandwidth of up to about 1 GHz, e.g., voice, data and video applications. In particular, trunk and distribution cable commonly used for these applications may be used. As shown in FIG. 6, the coaxial cable 34 comprises an inner conductor 40, a dielectric 42 surrounding the inner conductor, and a metallic sheath 44 which acts as an outer conductor surrounding the dielectric. The coaxial cable 34 may further include a protective jacket 46 surrounding the metallic sheath as illustrated in FIGS. 5 and 6.

In the coaxial cable 34, the inner conductor 40 is formed of a suitable electrically conductive material such as copper or aluminum. Preferably, the inner conductor 40 is solid copper, copper tubing or a copper-clad aluminum. In the embodiment illustrated, only a single inner conductor 32 is shown, as this is the most common arrangement for coaxial cables of the type used for transmitting RF signals.

The inner conductor 40 is surrounded by a dielectric 42 such as air or a polymeric material. Typically, when air is used as the dielectric material, longitudinally spaced apart polymer disks are used as spacers between the inner conductor 40 and the metallic sheath 44. Preferably, however, the dielectric 42 is a solid continuous polymeric material and may be adhesively bonded to the inner conductor 40 using a suitable adhesive such as an ethylene-acrylic acid copolymer. Exemplary polymers for the dielectric 42 include polyethylene, polypropylene, and polystyrene. Preferably, in order to reduce the density of the dielectric and hence reduce the dielectric constant, the dielectric should be an expanded closed cell foam dielectric. Preferably, the foam dielectric is high density polyethylene or a blend of high and low density polyethylene. Typically, the foam dielectric has a density of less than about 0.28 g/cc.

Closely surrounding the dielectric 42 is an outer tubular metallic sheath 44. Preferably, the sheath 44 is adhesively bonded to the dielectric 42 using a suitable adhesive such as an ethylene-acrylic acid copolymer to support the sheath during bending of the coaxial cable 34. The sheath 44 is also preferably characterized by being both mechanically and electrically continuous. This allows the sheath 44 to effectively serve to mechanically and electrically seal the cable against outside influences as well as to seal the cable against leakage of RF radiation. The metallic sheath 44 may be formed of various electrically conductive metals such as copper or aluminum. For voice, data and video applications, the outer diameter of the metallic sheath is typically between 0.5 inches and 1.0 inch.

As stated above, the outer surface of the metallic sheath 44 may be surrounded by a protective jacket 46. Suitable compositions for the outer protective jacket 46 include thermoplastic coating materials such as polyethylene, polyvinyl chloride, polyurethane and various rubbers. Typically, the protective jacket 46 is adhesively bonded to the sheath 44 with a suitable adhesive such as an ethylene-acrylic acid copolymer.

Preferably, the coaxial cable 34 used in the present invention is designed to have good flexibility, i.e., enhanced bending characteristics, thereby enabling the coaxial cable to be readily formed into a helical configuration around the support strand 32 without causing crimps, bends or other defects in the coaxial cable. Desirably, the coaxial cable used in the present invention should have a minimum bend radius of less than 10 cable diameters. The minimum bend radius is determined by progressively bending the cable over smaller and smaller mandrels of uniform radius. After each bend, the cable is examined for any signs of waviness or buckling. The smallest radius mandrel in which the first signs of waviness occur is defined as the minimum bend radius.

In order to provide a coaxial cable 34 having the desired flexibility and bending characteristics, a relatively thin metallic sheath 44 is preferably used. The preferred coaxial cable for use in the present invention has a tubular metallic sheath 44 with a wall thickness selected so as to maintain a T/D ratio (ratio of wall thickness to outer diameter) of less than 2.5 percent. In addition, adhesively bonding the sheath 44 to the foam dielectric 42 increases the flexibility of the coaxial cable 34 by supporting the sheath 44 in bending to prevent damage to the coaxial cable. Furthermore, increased core (inner conductor 40 and dielectric 42) stiffness in relation to sheath 44 stiffness is beneficial to the bending characteristics of the coaxial cable 34. Specifically, the coaxial cables 34 used in the invention preferably have a core to sheath stiffness ratio of at least 5. One preferred cable having suitable flexibility for use in the invention is QR cable, available from CommScope, Inc. in Hickory, N.C.

The core to sheath stiffness ratio described above is determined by independently evaluating the compressive stiffness of the core (inner conductor 40 and dielectric 42) and the outer conductor 44 as would be observed from its side. A fixed length (1 inch) sample of core and outer conductor is placed in a compressive load fixture (universal tester) and deflected a defined amount. For both the core and the outer conductor, this deflection is defined as 12% of its respective diameter. The ratio of stiffness is then expressed as a ratio of the recorded loads at the defined deflection.

As will be readily understood by one skilled in the art, the coaxial cable 34, used in the invention, and specifically, the conductors used in the coaxial cable 34 are subject to thermal expansion and contraction because of seasonal and daily temperature changes which may cause flexure in the cable and possibly damage to the cable. Advantageously, because the coaxial cable 34 is helically wound around the support strand 32 without the existence of expansion loops, the thermal expansion (contraction) of the coaxial cable is distributed throughout the cable and does not result in localized stress to the cable. Furthermore, the coaxial cable 34 is preferably helically wound around the support strand 32 using varying lay lengths L thereby limiting the introduction of structural return loss (SRL) or periodic impedance mismatches which negatively affect the transmitted RF signal.

The coaxial cable 34 used in the invention is preferably tightly wrapped helically around the support strand 32 such that the coaxial cable 34 contacts the support strand along a majority of the length of the support strand. Therefore, the coaxial cable 34 is supported by the support strand 32 without the need for lashing or tying the coaxial cable to the support strand. The tightness of the coaxial cable 34 around the support strand 32 may be described as a ratio of the length of coaxial cable used in the communications cable 30 to the length of support strand 32 used in the communications cable. For example, the excess length of coaxial cable 34 per 100 feet of support strand 32 is between about 6 and 18 inches and typically between about 8 and 12 inches. Therefore, the ratio of the length of straight coaxial cable 34 to the length of support strand 32 is between about 1.005 and 1.015 and typically is between about 1.006 and 1.010. As will be understood, the excess length, and thus the above ratio, may also be determined by straightening out the coaxial cable 34 used in the communications cable.

It has been discovered that the ratio of the length of straight coaxial cable 34 to the length of support strand 32 is critical to the manufacture and effective installation of the stranded communications cables of the invention. Specifically, in stranded communications cables which have a ratio below 1.005, the coaxial cable is subject to high tensile forces during periods of thermal contraction which can cause the coaxial cable to pull out of connectors. Likewise, if this ratio is greater than 1.015, the coaxial cable is too loosely wound around the support strand and manufacture of the stranded cables becomes difficult to control. In this case, the coaxial cable can collide with process machinery during manufacture resulting in damage to the coaxial cable. In addition, the coaxial cable tends to form large loops during manufacture which makes it difficult to collect the cable on reels and can make installation of the cable on utility poles extremely difficult. This ratio has been particularly critical to the manufacture and installation of large diameter cables, i.e., cables wherein the diameter of the tubular metallic sheath 44 is greater than 0.5 inches.

Figure 8:
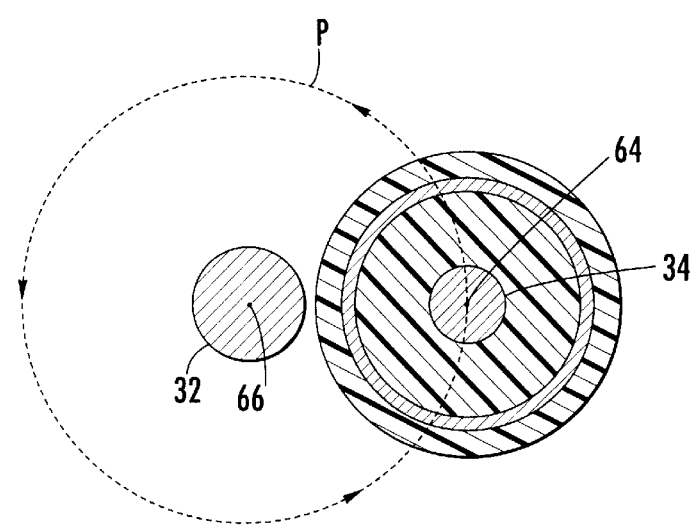
FIG. 8 is a cross-sectional view taken along lines 8—8 of FIG. 7 and showing how the coaxial cable is wound about the support strand.

The communications cable 30 of the invention is constructed prior to installation. The method of forming the communications cable 30 comprises advancing the support strand 32 and the coaxial cable 34 from supply reels 50 and 52, respectively, by uncoiling the support strand and the coaxial cable from the reels. The support strand 32 and the coaxial cable 34 are preferably drawn with a predetermined amount of tension from the reels 50 and 52, by drawing means 54. The support strand 32 and coaxial cable 34 are subsequently guided into a strander 56 which aligns the support strand and coaxial cable into a parallel orientation. The support strand 32 and the coaxial cable 34 then advance into an end effector 58 which contains biasing means for bending the coaxial cable in a helical configuration tightly around the support strand. Preferably, a series of rollers 59 biases and guides the coaxial cable 34 around the support strand 32. As shown in FIG. 8, the path P of the coaxial cable 34 around the support strand 32 is generally circular and may be either clockwise or counterclockwise. As stated above, the coaxial cable 34 is preferably flexible to allow the coaxial cable to be wrapped helically around the support strand 32 without causing damage to the coaxial cable. Also, one or more additional cables (e.g. coaxial cables) may be aligned parallel to the coaxial cable 34 and wrapped helically around the support strand 32.

As described above, the coaxial cable of the invention is manufactured such that the ratio of the length of straight coaxial cable 34 to the length of support strand 32 is between about 1.005 and 1.015 and typically is between about 1.006 and 1.010. In addition, the coaxial cable 34 is wrapped around the support 32 using varying lay lengths L. As illustrated in FIG. 5 and for purposes herein, the lay length L is defined as the distance between the points in which the center 64 of the coaxial cable 34 crosses directly over the center 66 of the support strand 32. Preferably, for the coaxial cable 34 typically used in the present invention, the lay length L oscillates within a predetermined range between about 24 and 32 inches. For example, the lay length L may oscillate between 25 and 27 inches or between 26 and 30 inches. The varied lay length L prevents periodic structural damage to the coaxial cable 34 and therefore limits the formation of structural return loss (SRL) or periodic impedance mismatches which negatively affect the transmitted RF signal such as by dissipating the signal corresponding to a certain range of frequencies.

Figure 7:
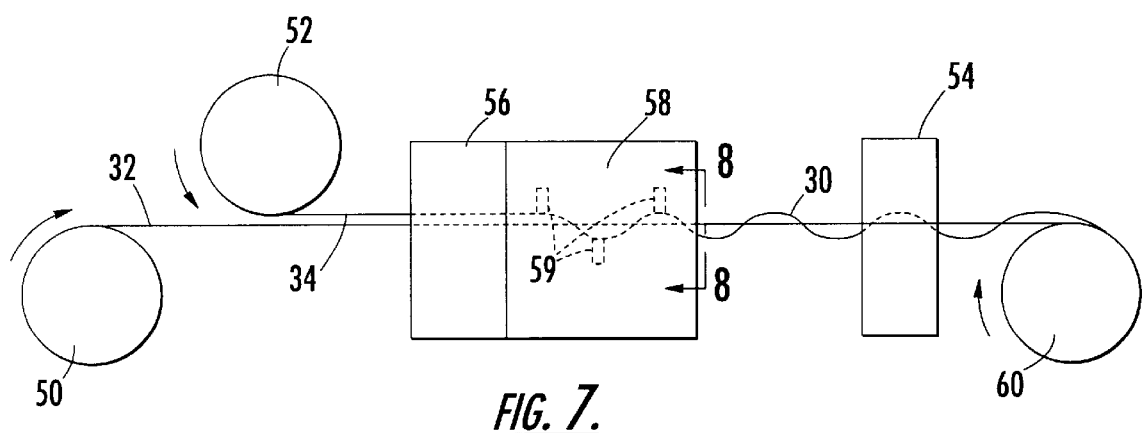
FIG. 7 is a schematic view of a method of forming a communications cable according to the invention.

As shown in FIG. 7, the coaxial cable 34 exits the end effector 58 helically wrapped around the support strand 32 to form the communications cable 30. The communications cable 30 is continuously drawn by the drawing means 54 located downstream from the end effector 58 and may be collected on a suitable container, such as reel 60, for storage and shipment.

Figure 1:
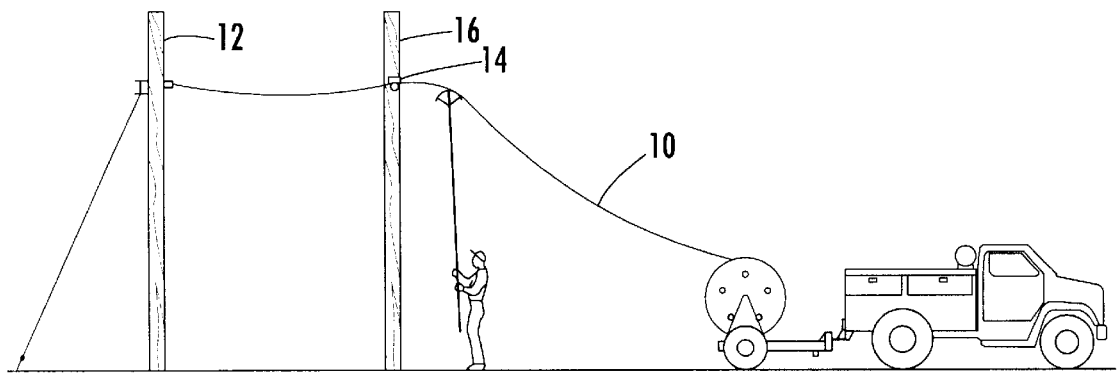
FIGS. 1–4 are schematic views showing a prior art method of aerially installing a communications cable by sequentially hanging a support strand, hanging a coaxial cable, affixing the coaxial cable to the support strand and forming expansion loops in the coaxial cable.
Figure 2:
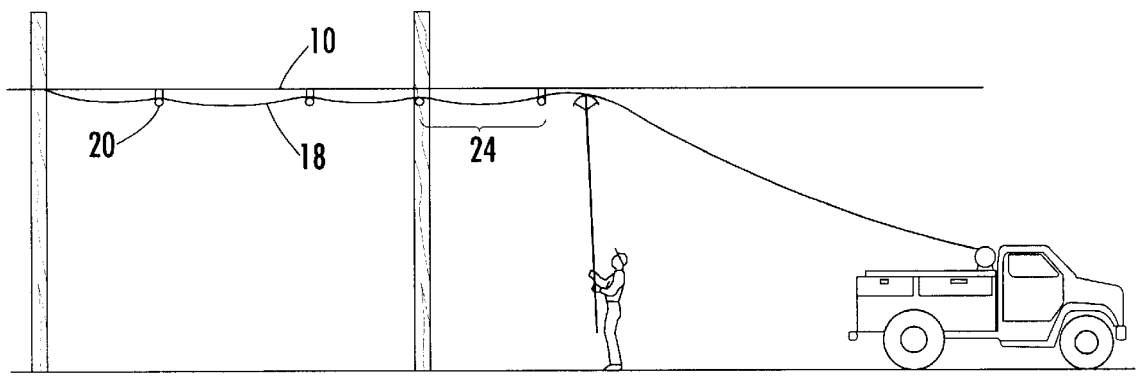
Figure 3:
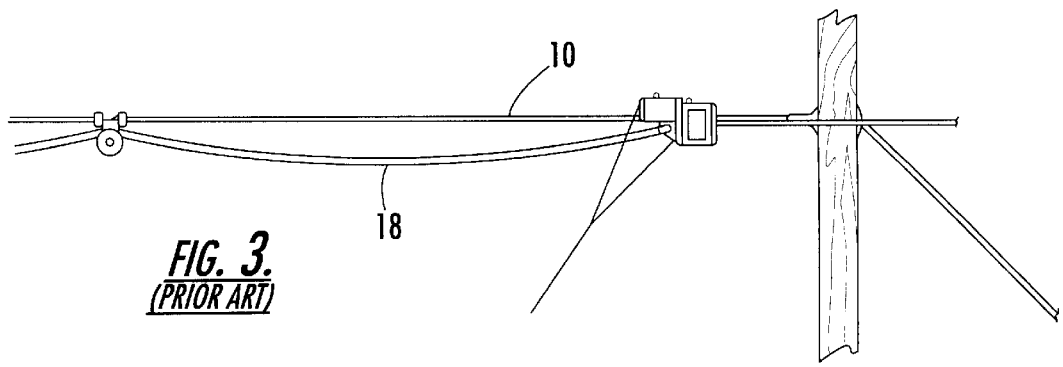
Figure 4:
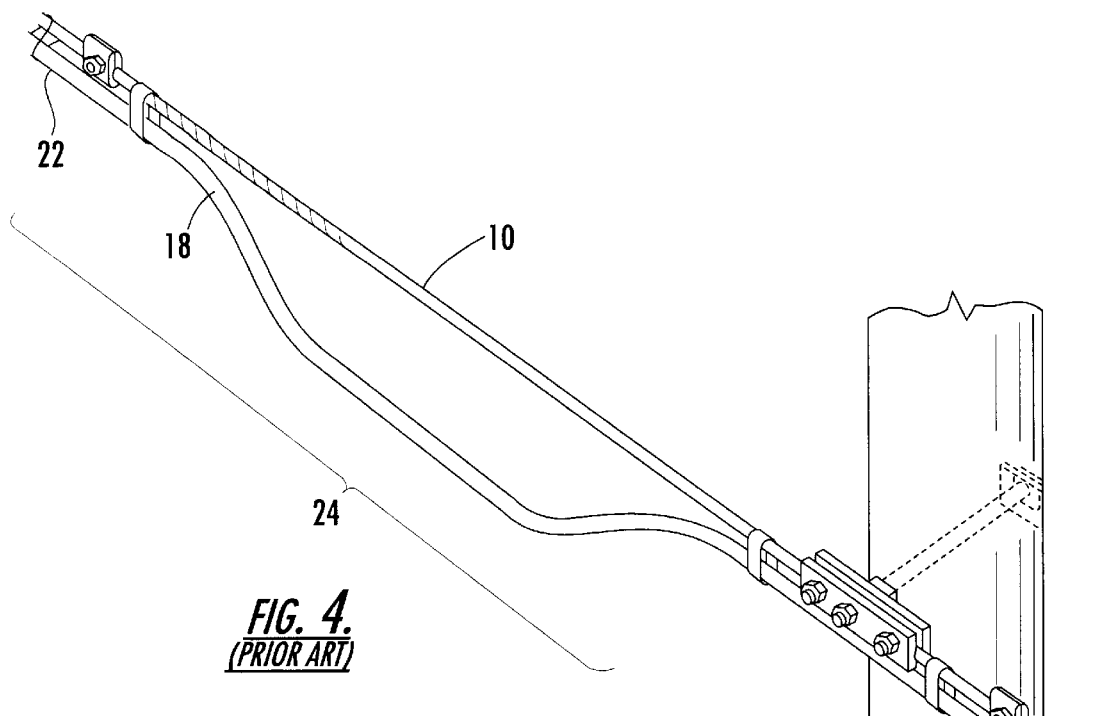
Figure 9:
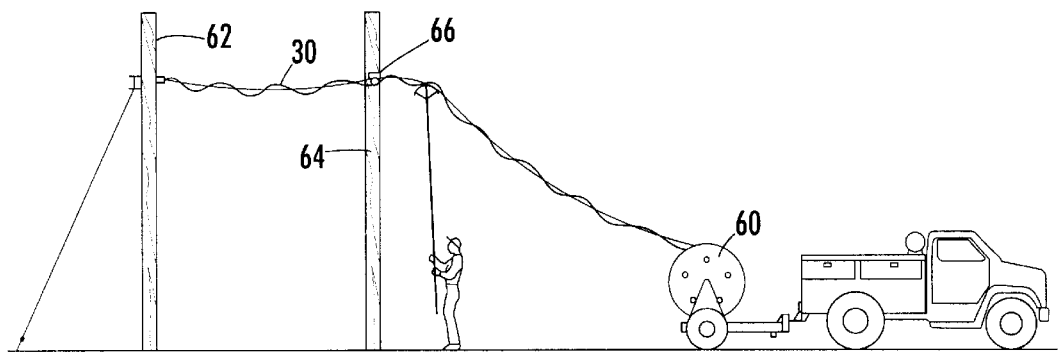
FIG. 9 is a schematic view of a method of aerially installing a communications cable in one pass according to the invention.

The communications cable 30 of the invention is especially suitable for aerial installation in which at least one of the locations onto which the communications cable is affixed is elevated from the ground. As illustrated in FIG. 9, a predetermined length of communications cable 30 is provided such as by uncoiling the communications cable from a suitable container such as reel 60. The communications cable 30 is guided to a first aerial location such as a first utility pole 62 and a first location on the support strand 32 is affixed to the utility pole by suitable means such as clamping means 18 (FIG. 1). A length of the communications cable 30 is then directed from first utility pole 62 to a second aerial location such as second utility pole 64. The communications cable may be guided aerially by suitable means such as pulley 66. Once the communications cable 30 has been directed to the second utility pole 64, a second location on the support strand 34 is then affixed to the second utility pole 64 and the support strand 34 is generally tensioned until it is substantially taut. The communications cable 30 may then be installed at other aerial locations in the same fashion.

The installation of the communications cable 30 is a one pass process and does not require separate installation of the support strand 32 and the coaxial cable 34. Therefore, the installation can be achieved relatively quickly. In addition, because of the helical winding of the coaxial cable 34 around the support strand 32, expansion loops in the coaxial cable are not necessary to prevent damage from thermal expansion. Furthermore, the communications cable 30 of the invention is not subject to localized stress from thermal expansion because the expansion is distributed along the length of the coaxial cable 34. As described above, the lay length L of the coaxial cable 34 around the support strand is varied 32. As a result, if periodic damage to the coaxial cable 34 occurs, the degradation of the RF signals transmitted by the coaxial cable will be minimized.

It is understood that upon reading the above description of the present invention, one skilled in the art could make changes and variations therefrom. These changes and variations are included in the spirit and scope of the following appended claims.

What is claimed is:

1. A communications cable for aerial installation comprising a support strand and at least one coaxial cable helically wound around said support strand such that the ratio of the length of coaxial cable to the length of support strand is between about 1.005 and 1.015, said coaxial cable comprising an inner electrical conductor, a dielectric surrounding the inner conductor, and an outer tubular metallic sheath surrounding the dielectric.

2. The communications cable according to claim 1 wherein the ratio of the length of coaxial cable to the length of support strand is between about 1.006 and 1.010.

3. The communications cable according to claim 2 wherein said tubular sheath has a diameter of between about 0.5 inches and 1.0 inch.

4. The communications cable according to claim 1 wherein said tubular sheath has a diameter of greater than 0.5 inches.

5. The communications cable according to claim 1 wherein said coaxial cable is helically wrapped around said support strand using a varying lay length.

6. The communications cable according to claim 1 wherein said coaxial cable is helically wrapped around said support strand using a lay length which oscillates within a predetermined range between about 24 and 32 inches.

7. The communications cable according to claim 1 wherein said at least one co axial cable comprises two or more coaxial cables aligned parallel to one another.

8. The communications cable of claim 1 wherein said coaxial cable further comprises a protective jacket surrounding the metallic sheath.

9. The communications cable according to claim 1 wherein said support strand comprises a galvanized steel cable.

10. A communications cable for aerial installation comprising a support strand and a coaxial cable helically wound around said support strand using a varying lay length such that the ratio of the length of coaxial cable to the length of support strand is between about 1.005 and 1.015, said coaxial cable comprising an inner electrical conductor, a dielectric surrounding the inner conductor, an outer tubular metallic sheath surrounding the dielectric and having a diameter of greater than 0.5 inches, and a protective jacket surrounding the metallic sheath.

11. A communications cable for aerial installation comprising a support strand and a coaxial cable helically wound around said support strand using a varying lay length such that the ratio of the length of coaxial cable to the length of support strand is between about 1.006 and 1.010, said coaxial cable comprising an inner electrical conductor, a dielectric surrounding the inner conductor, an outer tubular metallic sheath surrounding the dielectric and having a diameter of between 0.5 inches and 1.0 inch, and a protective jacket surrounding the metallic sheath.

12. A communications cable for aerial installation comprising a support strand and a coaxial cable helically wound around said support strand using a varying lay length such that the ratio of the length of coaxial cable to the length of support strand is between about 1.005 and 1.015, said coaxial cable comprising an inner electrical conductor, a polyethylene foam dielectric surrounding the inner conductor, an outer tubular metallic sheath surrounding the dielectric, an adhesive layer bonding the dielectric to the metallic sheath and situated therebetween, and a protective jacket surrounding the metallic sheath, said coaxial cable having a minimum bend radius of less than 10 cable diameters.

* * * * *

UNITED STATES PATENT AND TRADEMARK OFFICE
CERTIFICATE OF CORRECTION

PATENT NO.   : 6,204,445 B1
DATED        : March 20, 2001
INVENTOR(S)  : Gialenios et al Page 1 of 1

It is certified that error appears in the above-identified patent and that said Letters Patent is hereby corrected as shown below:

<u>Title page, Insert the following items:</u>
-- [60] Provisional application No.60/082,305, filed on Apr. 28, 1997 and Provisional application No. 60/077,179, filed on Feb. 6, 1997 -- .

<u>Column 1,</u>
Line 4, insert the following: -- Cross Reference To Related Applications -- Reference is made to and priority claimed from U.S. provisional application No. 60/082,305 filed on 4/28/97 and Provisional appl. No. 06/077,179, filed on 2/6/92.

Signed and Sealed this

Fourth Day of September, 2001

*Attest:*

*Attesting Officer*

NICHOLAS P. GODICI
*Acting Director of the United States Patent and Trademark Office*